United States Patent [19]
Edrich

[11] Patent Number: 5,987,604
[45] Date of Patent: Nov. 16, 1999

[54] METHOD AND APPARATUS FOR PROVIDING EXECUTION OF SYSTEM MANAGEMENT MODE SERVICES IN VIRTUAL MODE

[75] Inventor: David S. Edrich, Santa Cruz, Calif.

[73] Assignee: Phoenix Technologies, Ltd., San Jose, Calif.

[21] Appl. No.: 08/946,416

[22] Filed: Oct. 7, 1997

[51] Int. Cl.[6] ........................................... G06F 9/44
[52] U.S. Cl. ............................... 713/1; 713/100
[58] Field of Search ...................... 713/1, 100; 709/1; 395/406

[56] References Cited

U.S. PATENT DOCUMENTS

| Re. 35,480 | 3/1997 | DeLisle et al. . |
| 4,926,322 | 5/1990 | Stimac et al. . |
| 5,255,379 | 10/1993 | Melo . |
| 5,274,834 | 12/1993 | Kardach et al. . |
| 5,276,888 | 1/1994 | Kardach et al. . |
| 5,280,599 | 1/1994 | Arai . |
| 5,283,889 | 2/1994 | DeLisle et al. . |
| 5,544,344 | 8/1996 | Frame . |
| 5,638,532 | 6/1997 | Frame et al. . |
| 5,644,755 | 7/1997 | Wooten ................................... 395/500 |
| 5,671,422 | 9/1997 | Datta ....................................... 395/734 |
| 5,784,625 | 7/1998 | Walker ..................................... 710/260 |
| 5,832,299 | 11/1998 | Wooten ....................................... 710/9 |

FOREIGN PATENT DOCUMENTS 0 768 603  4/1997  European Pat. Off. .

OTHER PUBLICATIONS

"Cache Freeze Function in Level 2 Cache Controller"; IBM Technical Disclosure Bulletin; vol. 37, No. 12; Dec. 1, 1994; pp. 467–468; XP000487854.

*Primary Examiner*—Dennis M. Butler
*Attorney, Agent, or Firm*—Blakely, Sokoloff, Taylor & Zafman

[57] ABSTRACT

The present invention is an apparatus and method for executing instructions in a system management mode in a processor-based system. The apparatus comprises a memory for storing instruction sequences by which the processor-based system is processed where the memory includes a system management random access memory (SMRAM). The apparatus also comprises a processor having a system address space, that executes the stored instruction sequences. The stored instruction sequences include process steps to cause the processor to: (a) configure the processor to operate in a protected mode while in a system management mode, the processor operating at address greater than one megabyte; (b) invoke a paging feature of the processor; (c) configure the processor to operate in a virtual mode; and (d) process the instruction sequences; wherein the process steps occur upon the receipt of an instruction to process a system management request.

30 Claims, 11 Drawing Sheets

GENERAL PURPOSE REGISTERS

FIG. 3A

| 31 | 16 | 15 | 8 | 7 | 0 | |
|---|---|---|---|---|---|---|
| | | | AH | AL | | EAX |
| | | | BH | BL | | EBX |
| | | | CH | CL | | ECX |
| | | | DH | DL | | EDX |
| | | | SI | | | ESI |
| | | | DI | | | EDI |
| | | | BP | | | EBP |
| | | | SP | | | ESP |

SEGMENT REGISTERS

FIG. 3B

| 15 | 0 | |
|---|---|---|
| | | CS |
| | | SS |
| | | DS |
| | | ES |
| | | FS |
| | | GS |

STATUS & CONTROL REGISTERS

FIG. 3C

| 31 | 16 | 15 | 0 | |
|---|---|---|---|---|
| | | IP | | EIP |

| | FLAG | | EFLAGS |
|---|---|---|---|

FIG. 3D

SYSTEM ADDRESS REGISTERS

| | 47　　　　　　　　　　　　　　　　　　　16 | 15　　　　0 |
|---|---|---|
| GDTR | 32-BIT LINEAR BASE ADDRESS | SIZE |
| IDTR | 32-BIT LINEAR BASE ADDRESS | SIZE |

FIG. 3E

| | SYSTEM SEGMENT REGISTERS<br>15　　0 | DESCRIPTOR REGISTERS | | |
|---|---|---|---|---|
| TR | SELECTOR | 32-BIT LINEAR BASE ADDRESS | 20-BIT SIZE | ATTRIBUTE |
| LDTR | SELECTOR | 32-BIT LINEAR BASE ADDRESS | 20-BIT SIZE | ATTRIBUTE |

FIG. 3F

| | 31　　　　　　　　　　　　　　　　　　　　　　　　　　　　0 |
|---|---|
| CR0 | PG　｜　　　　　　　　　　　　　　　MSW |
| CR1 | RESERVED |
| CR2 | PAGE FAULT LINEAR ADDRESS |
| CR3 | PAGE DIRECTORY BASE ADDRESS　｜ |
| CR4 | |

METHOD AND APPARATUS FOR PROVIDING EXECUTION OF SYSTEM MANAGEMENT MODE SERVICES IN VIRTUAL MODE

BACKGROUND OF THE INVENTION

1. Field of the Invention

The present invention relates generally to memory in microcontroller-based systems, and more particularly to an apparatus and method of executing system management mode services in the virtual mode.

2. Description of the Related Art

Modern computers based on the personal computer architecture may perform power management or other system management functions by employing an operating mode of the Intel x86 family of microprocessors, known as the System Management Mode (SMM). SMM can be used by the system firmware to control product-specific hardware features in a manner which is transparent to the operating system and applications software. SMM may be used, for example, for system management information such as the system configuration or the configuration of a powered-down device, or to invoke a power-saving routine such as a zero-volt suspend function.

The SMM is invoked through an SMI, which typically executes slowly, as compared to the rate of normal code execution. This is because SMIs typically operate below the 1 Megabyte boundary in an uncached memory area. This feature is implemented in order to avoid cache conflict with overlapping memory. During the occurrence of the SMI, the CPU executes in the SMM mode which is exactly like real mode except the segment limits extend to 4 Gbytes rather than just 64 Kbytes for data accesses. Code execution addressability is still limited to only 1 Megabyte. Such an approach results in limited system performance.

One alternate approach involves the transfer of SMI code and data, whenever an SMI is invoked, from a cacheable region above the 1 Megabyte boundary to a cacheable region below the 1 Megabyte boundary. Execution of the SMI will then occur in standard SMM mode, and the SMI code is transferred back to the cacheable region above the 1 Megabyte area upon completion of the SMI. Such an approach takes significant time and therefore results in reduced system performance.

Accordingly, there is a need in the technology for an apparatus and method for overcoming the aforementioned problems. In particular, there is a need for an apparatus and method for efficient and secure execution of system management interrupt service code in a cached area without having to rewrite existing software.

BRIEF SUMMARY OF THE INVENTION

The present invention is an apparatus and method for executing instructions in a system management mode in a processor-based system. The apparatus comprises a memory for storing instruction sequences by which the processor-based system is processed. The apparatus also comprises a processor having a system address space, that executes the stored instruction sequences. The stored instruction sequences include process steps to cause the processor to: (a) configure the processor to operate in a protected mode while in a system management mode, the processor operating at an address greater than one megabyte; (c) invoke a paging feature of the processor; (d) configure the processor to operate in a virtual mode; and (e) process the instruction sequences stored, wherein the process steps occur upon the receipt of an instruction to process a system management request.

DETAILED DESCRIPTION OF THE PREFERRED INVENTION

The present invention creates a virtual monitor that runs under the system management mode (SMM) with memory paging enabled to execute SMI code in virtual mode. The virtual mode operation allows the SMM code that was written (for SMM mode that had to run below 1 Megabyte) to execute above the 1 Megabyte boundary. In particular, the entire SMI handler is mapped above the 1 Megabyte boundary and power management code is executed as a page-enabled, protected mode virtual task within SMM mode. With the SMI handler code in a completely separate memory space, cache flushes would be unnecessary when entering the SMM, since memory usage with the regular system would not overlap.

Figure 1:
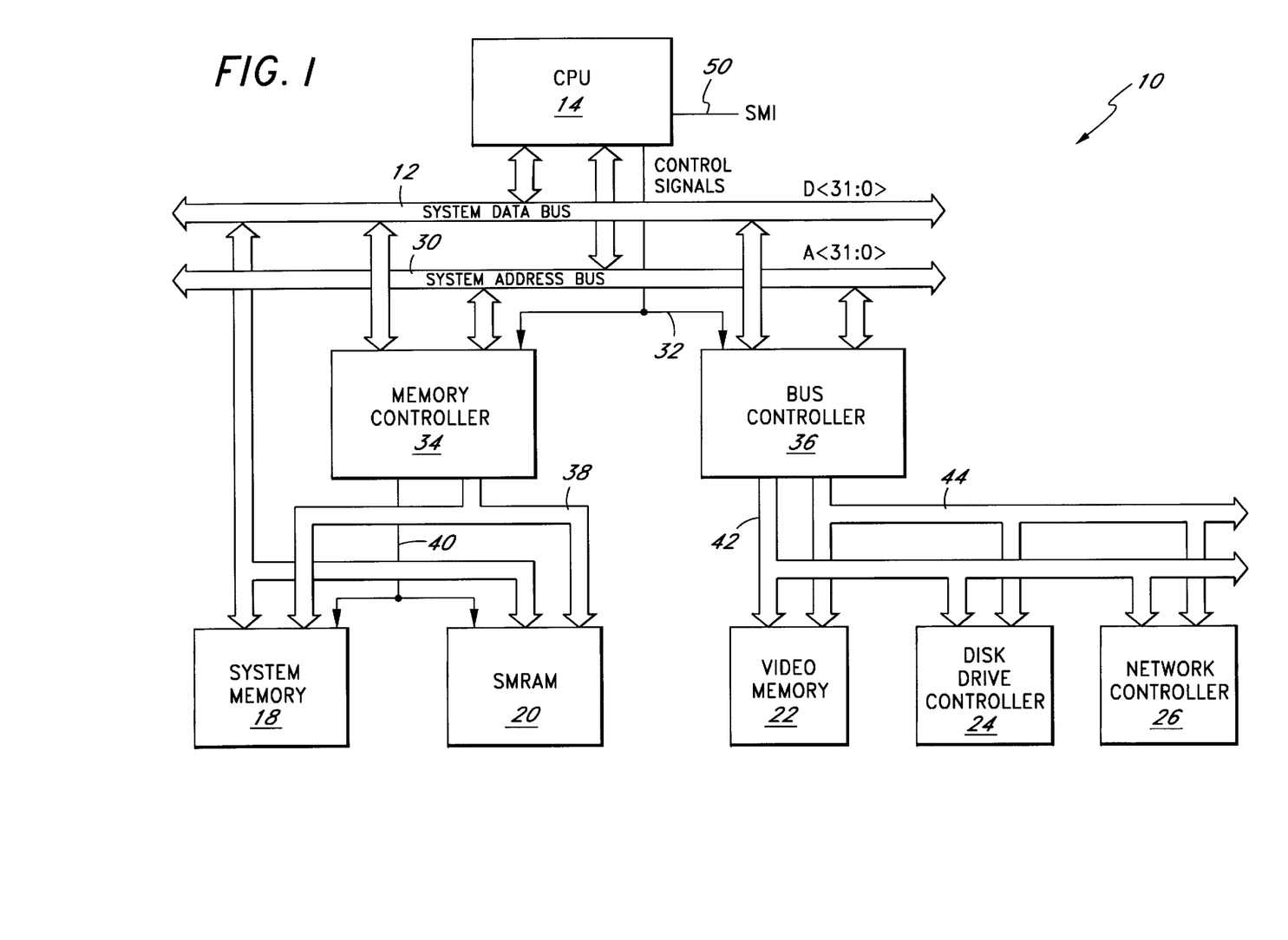
FIG. 1 illustrates an exemplary processor system which implements the processes of the present invention.

The present embodiment is described in reference to a processor system 10. FIG. 1 illustrates an exemplary processor system 10 which implements the processes of the present invention. Within the processor system 10, bus transactions are performed via a system data bus 12 between a processor or central processing unit (CPU) 14 and a system memory 18, a System Management Random Access Memory (SMRAM) 20, a video memory 22, and various I/O and peripheral modules such as a disk drive controller 24 and a network controller 26. The CPU 14 is coupled via a system address bus 30 and a CPU control signal line 32 to a memory controller 28 and a bus controller 36. The memory controller 34 is in turn coupled to the system memory 18 and SMRAM 20.

The memory controller 34 provides memory address via lines 38 and memory control signals via lines 40 to the system memory 18 and SMPAM 20 to enable data transfers between the system memory 18 or SMRAM 20 and the CPU 14 via system data bus 12. The CPU 14 is also coupled via the system address bus 30, system data bus 12 and CPU control signal line 32 to the bus controller 36, which is in turn coupled via a buffered address bus 42 and a buffered data bus 44 to the video memory 22, disk drive controller 24, the network controller 26 and any other peripheral device. The processor system 10 may be implemented as a desktop computer, a notebook computer or a server. The memory controller 34 and other system logic are typically integrated into what is termed a chipset to provide power management BIOS services. Examples of such chipsets include the Falconer chipset manufactured by Seiko-Epson under the part designations SPC8210 and SPC8220. Other examples of such chipsets include the INTEL 430TX, INTEL 430HX, and INTEL 440BX chipsets.

In one embodiment, the CPU 14 is the Intel 486 microprocessor marketed by Intel Corporation. In an alternate embodiment, the CPU 14 may be the K-6 microprocessor as marketed by AMD. In a further embodiment, the CPU 14 is the 586 microprocessor as marketed by Cyrix Corp. It is understood by one of ordinary skill in the technology that the present invention can be implemented in any processor-based system which employs any microprocessor that provides the use of a System Management Mode (SMM), which is an operating mode that employs a dedicated interrupt line (line 50 in FIG. 1) and memory space SMRAM 20. SMM is used to implement intelligent power management and other enhanced system functions in firmware in a manner which is completely transparent to the operating system and applications software.

SMM is invoked by generating a System Management Interrupt via assertion of the SMI signal to the CPU 14. The CPU 14, in response, asserts the SMIACT control signal provided via line 32 which accesses SMRAM 20. SMRAM 20 is a memory space dedicated and secured for use in SMM only—i.e., the operating system and applications software do not have access to this space. The current CPU 14 state (context) is stored in SMRAM 20 after assertion of the SMIACT signal and the CPU 14 then jumps to a location in SMRAM 20 to execute the SMI handler code for performing the system management activities. Upon completion of the system management activities, the SMI handler executes a resume (RSM) instruction which restores the CPU 14's context from SMRAM 20, de-asserts the SMIACT signal, and then returns control to the previously interrupted operating system or application program execution.

Addresses asserted by the CPU 14 (FIG. 1) on the address bus 30 are referred to in hexadecimal format, denoted by the suffix 'H'. The Intel microprocessor's address bus 30 is 32 bits wide and is thus capable of addressing a four gigabyte system address space 50. The SMRAM 20 may be located anywhere within this system address space 50, however, as implemented in many chipsets (e.g., in the Falconer chipset manufactured by Seiko-Epson under the part designations SPC8210 and SPC8220), the CPU 14 is configured to automatically map the SMRAM code and data from physical memory to a portion of the CPU 14's address space 50 that is below 1 Megabyte.

Figure 2A:
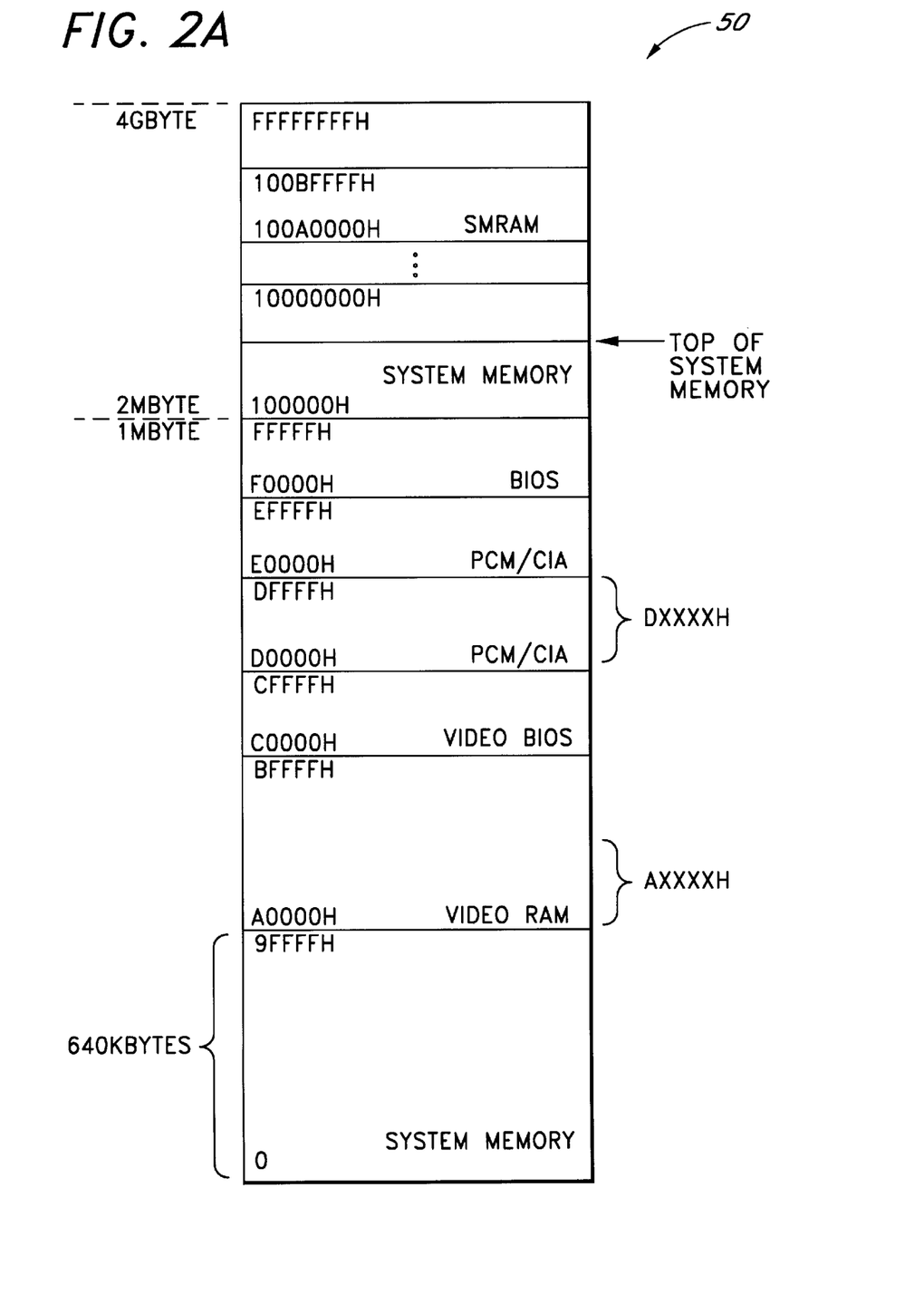
FIG. 2A illustrates an exemplary system address map 50 for the processor system of FIG. 1.

FIG. 2A illustrates an exemplary system address map or space 50 for the processor system 10 of FIG. 1. The lowest 640 Kbytes of system address, that is, 0H–9FFFF, map to system memory 18. System addresses A0000H–BFFFFH map to video memory 22. System addresses C0000H–CFFFFH map to video BIOS code. System addresses D0000H–DFFFFH and E0000H–EFFFFH are often mapped to separate PCMCIA peripheral areas respectively, or may be mapped to other types of peripheral devices. System addresses F0000H–FFFFFH are reserved for BIOS code. System addresses 100000H (1 Megabyte) and beyond are mapped to system memory for applications use.

Figure 2B:
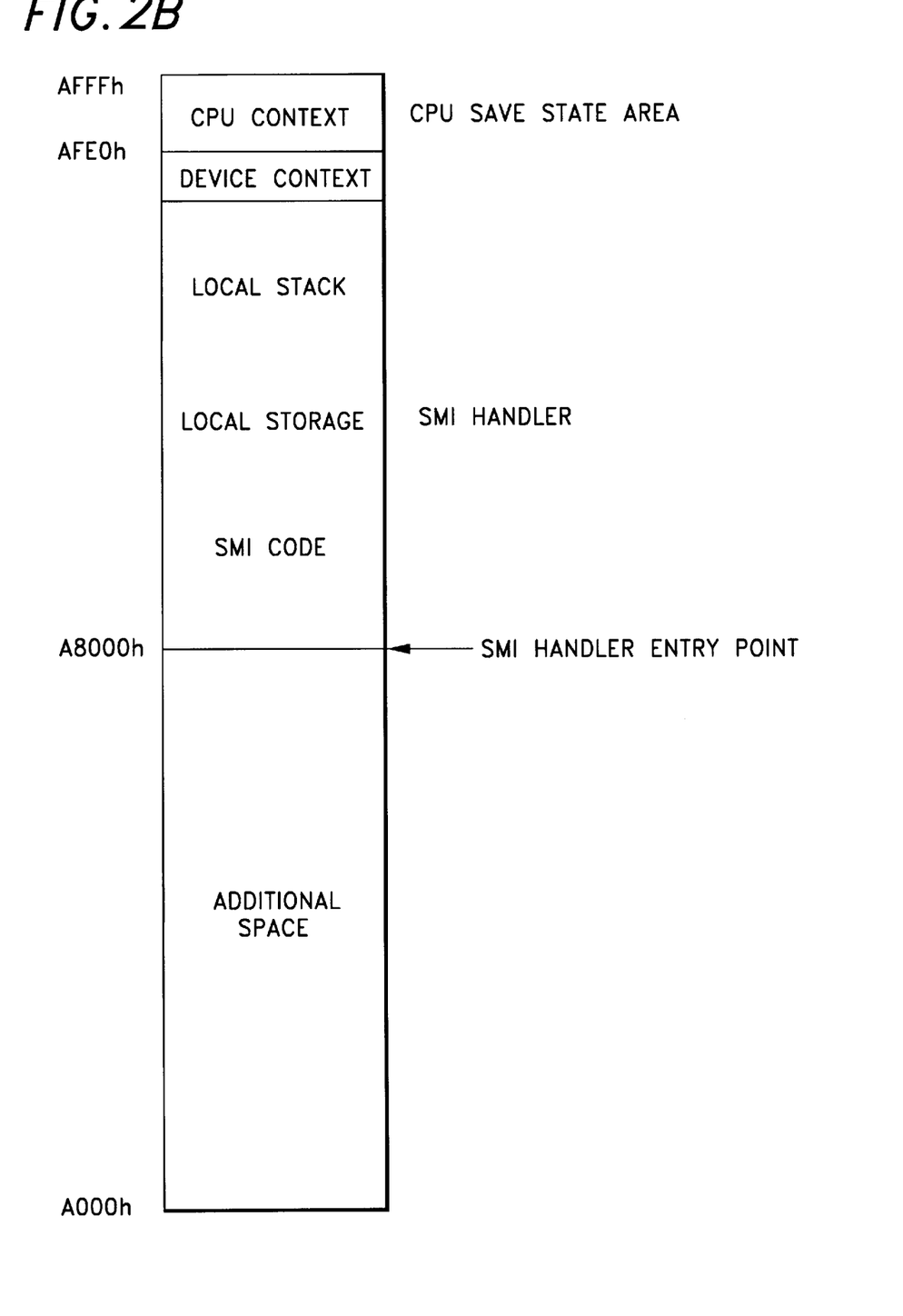
FIG. 2B illustrates an exemplary layout of SMRAM 20.

FIG. 2B illustrates an exemplary layout of SMPAM 20. The processor or CPU 14 pre-defines the range of addresses within SMRAM 20 that are used to save the CPU's 14 state (or context) when entering SMM. The CPU 14 also specifies the entry point of the SMI code. These locations are relative to the base address of the SMRAM 20. The other areas of SMRAM 20 illustrated in FIG. 2B are implementation-specific and left to the SMM programmer to define.

In one embodiment, the base address of SMRAM 20 is set by the CPU 14 to a default value of A0000h. The CPU 14 defines a 512 byte region of SMRAM starting at location AFFFFh (SMRAM base +FFFFh) downward to AFE00h for saving the CPU's 14 context. Once the CPU's 14 context is saved, the CPU 14 jumps to the entry point of the SMI handler at SMM location A8000h (SMRAM base +8000h). The SMI handler then executes its routine within SMRAM, using it to store data and stacks as required.

Although the CPU 14 may be implemented using a number of designs as discussed above, for present discussion purposes, the x86 family of Intel processors will be referred to. FIGS. 3A–3F illustrate the registers of the x86 family of processors which are used in the discussion of the present invention. The x86 family of processors each include eight thirty-two bit general registers EAX, EBX, ECX, EDX, ESI, EDI, EBP and ESP. The sixteen lower order bits of the AX, BX, CX, DX registers are independently addressable in eight bit increments as the AH (high), AL (low), BH, BL, CH, CL, DH and DL registers for byte addressing. In addition, the processors contain six sixteen bit segment registers which hold segment selectors that index into tables of segment descriptors in memory for determining the addresses of the segments. Two thirty-two bit registers, EFLAGS and EIP (instruction pointer) are used for status and control purposes.

Figure 3A:
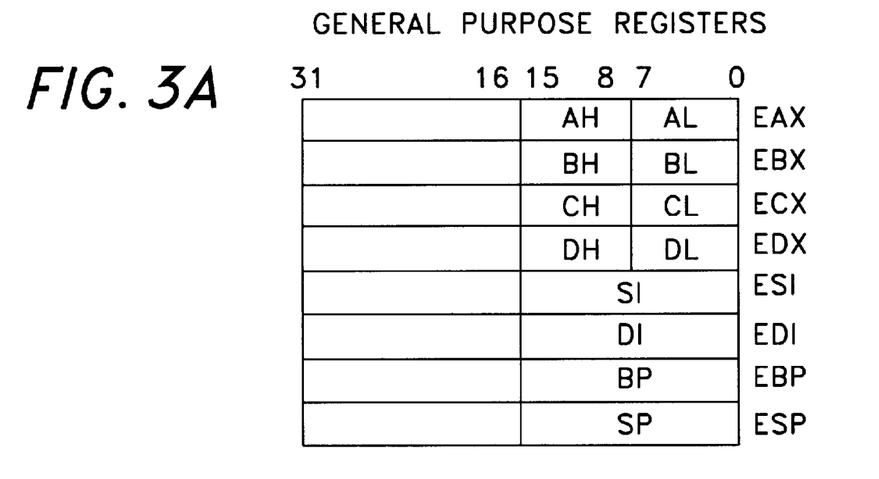
FIGS. 3A–3G illustrate the registers of one embodiment of the CPU 14.
Figure 3B:
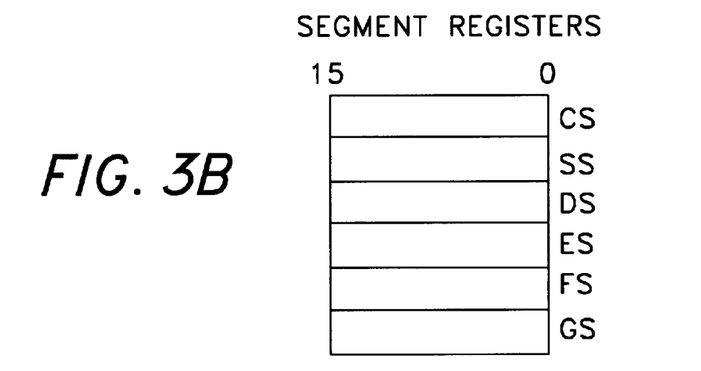
Figure 3C:
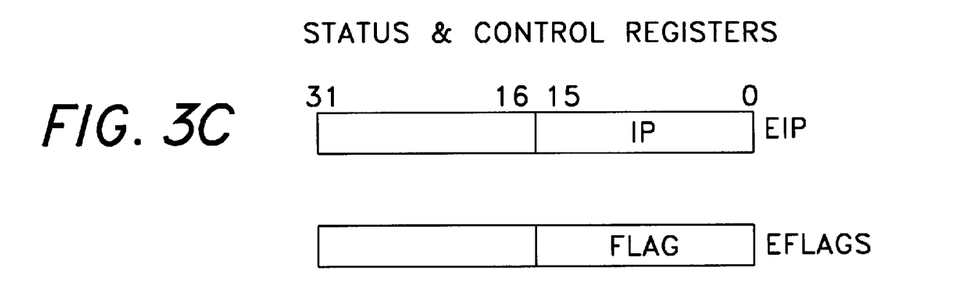
Figure 3D:
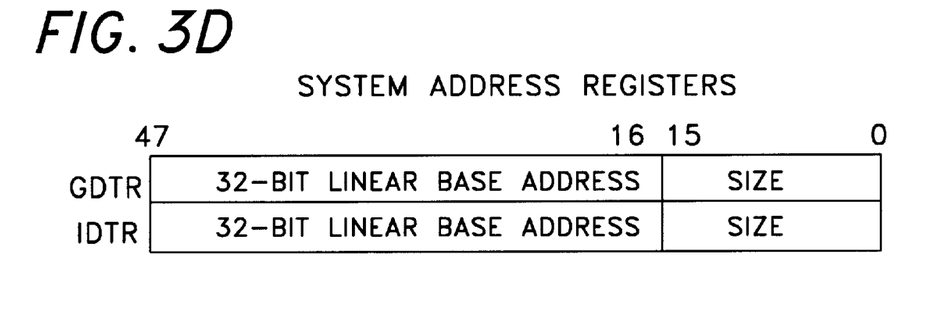
Figure 3E:
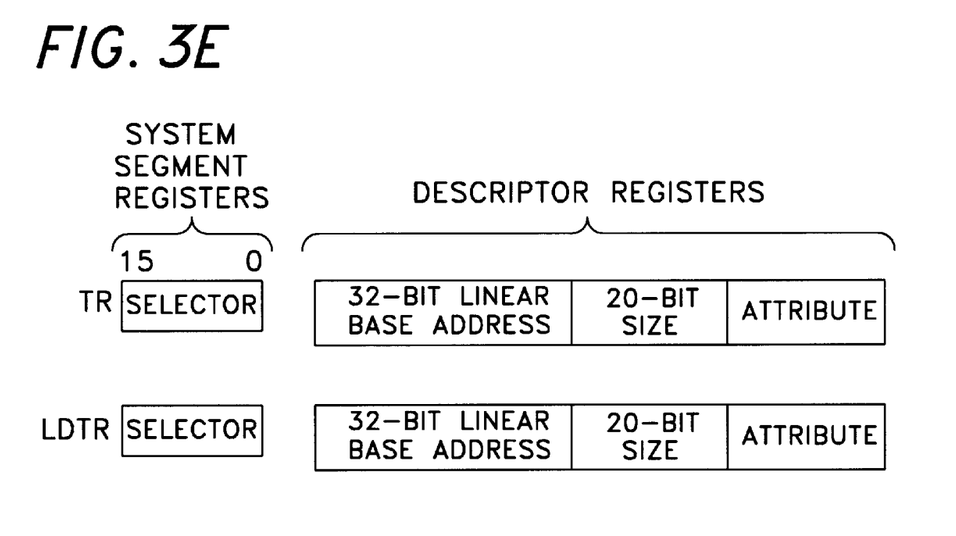

Each x86 processor also includes four registers used for memory management. A global descriptor table register (GDTR) stores the base address at which a global descriptor table may be found in memory; the global descriptor table holds the segment descriptors which provide a base address, a size and protections by which segment addressing is accomplished. A local descriptor table register (LDTR) also stores base addresses at which local descriptor tables may be found in memory; and a local descriptor table holds the segment descriptors by which segment addressing for individual programs is accomplished. A task register (TR) holds information including the address of a task state descriptor (TSS) in the global descriptor table which is used to switch between programs. An interrupt descriptor table register (IDTR) holds address and other information pointing to a table from which the addresses for interrupt operations may be determined.

Figure 3F:
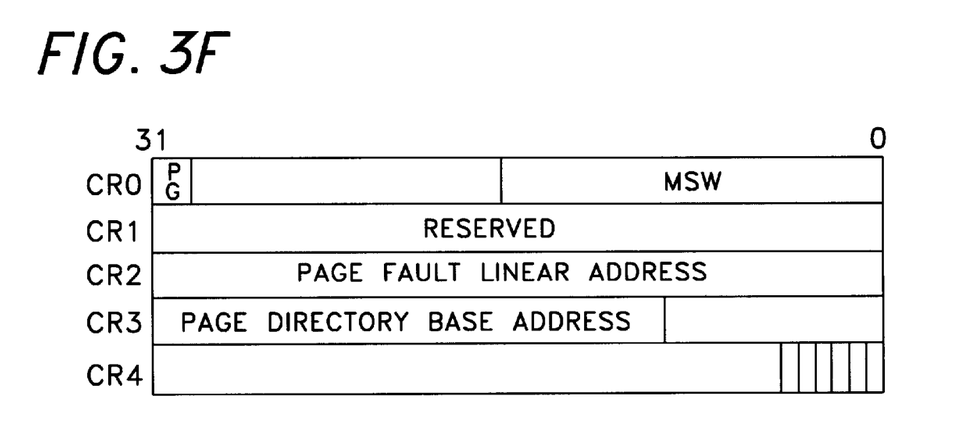

The processors also include four control registers CR0, CR1, CR2 and CR3. The CR0 register holds system control flags which control the modes of operation or indicate states which apply to the processor. The CR0 register holds various control bits including a paging bit (31) which must be set for paging to occur and which must be cleared when paging is to be disabled.

In the x86 family of processors, a program is referred to as a task. A task is started by an exception, jump, interrupt or a call. When one of these instructions for transferring an operation is used with reference to a destination, to invoke a task switch, switching between programs will occur. A task switch transfers execution from one program to another. When this transfer occurs, the contents of nearly all of the registers used with the previous process must be saved, especially the contents of the EFLAGS register which contains the results of the conditional operations already underway. The state of the various tasks is saved to the task state segment (TSS) (see FIG. 4) which is a data structure defined by a task state segment descriptor. A task state segment descriptor includes the base address of the task state segment and a busy bit which indicates that the task is presently running or waiting to run. In addition to a task state segment descriptor, a task gate descriptor which provides an indirect index to a task state segment descriptor may be used for transfer of control between tasks.

Figure 4:
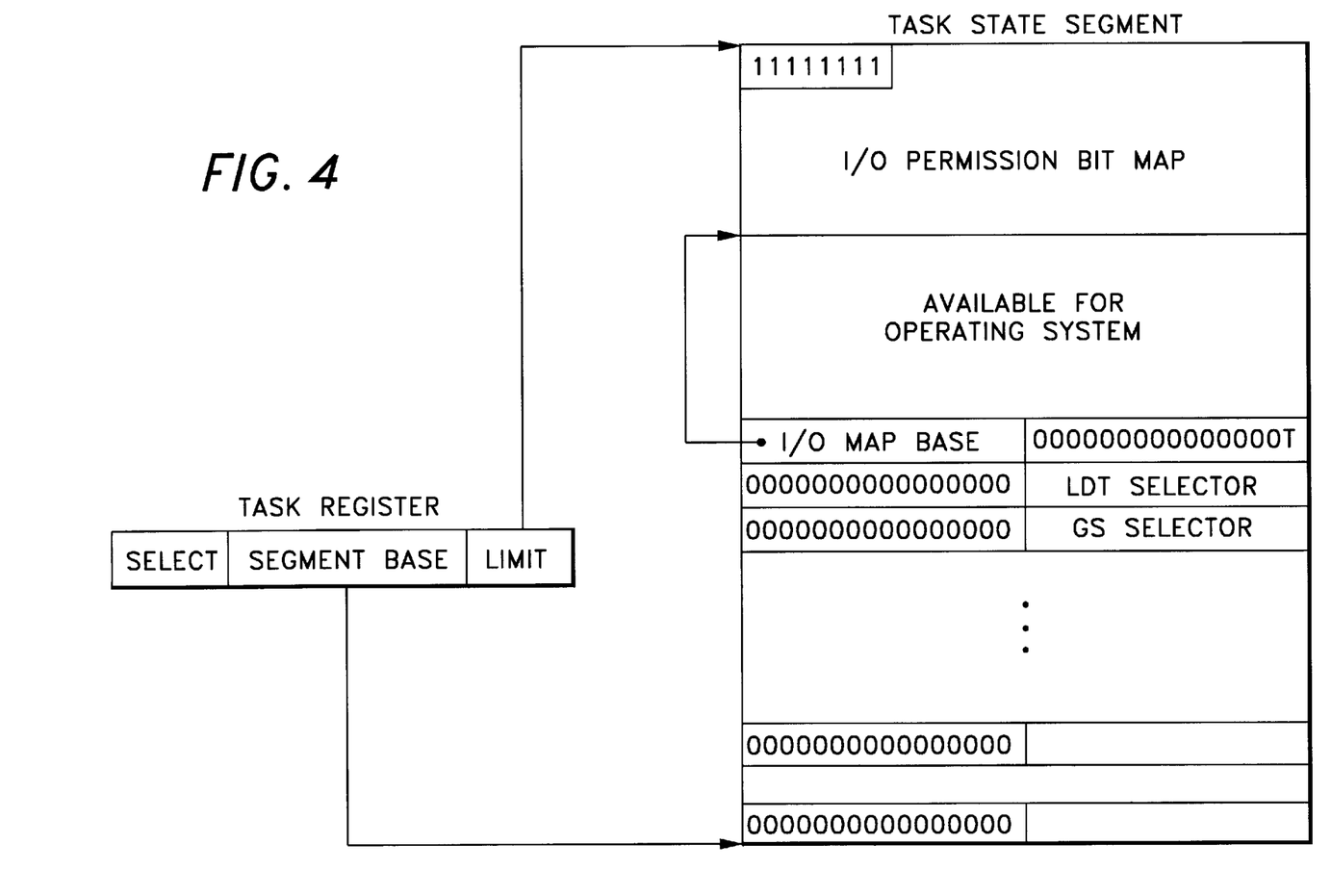
FIG. 4 illustrates one embodiment of the I/O bit map utilized in the present invention.

To provide multitasking, a task state segment must be constructed and a TSS descriptor must be created and placed in the global descriptor table so that the task state segment may be accessed and the saved state recovered. In addition, a task register TR must be loaded with an index to the TSS descriptor in the global register so that the task state segment may be accessed. The x86 family of processors also provides a protection mechanism for accesses to the I/O address space through the use of an I/O bit map. FIG. 4 illustrates an exemplary I/O bit map in a task state segment (TSS). The I/O bit map is part of the TSS of the respective task, so that different tasks can refer to different I/O bit maps. The I/O map base entry in the TSS descriptor provides the offset within the TSS where the corresponding I/O bit map begins. A valid I/O bit map is present if the I/O map base is contained in the TSS. The I/O bit map must be created during the power-on self test (POST) or after an SMI has been invoked, as discussed in detail in the following sections. The I/O bit map is examined by the CPU 14 to determine whether the required I/O port or an I/O location can actually be addressed. For example, the port or location with the address 0 is associated with the bit contained in the map that has an offset of 0, and the port or location with the address 1 is associated with the bit that has an offset of 1, etc. When the bit in the map corresponding to the port or location is cleared (equals 0), and there is an access to the applicable port, the particular port or I/O location can be used for the task. Conversely, if the bit in the map corresponding to the I/O location is set (equals 1), the particular I/O location cannot be used for the task. The length of the map sets the additional number of protected ports of I/O locations. All of the ports that are not included in the map are automatically assigned a set bit. An access to a port that is not included in the map automatically products an exception. In one embodiment, when using the Pentium processor, a total of (64 K ports)/(8 bits for every byte), that is, 8192 bytes are necessary to protect the complete I/O address space of the Pentium processor with 64 Kbytes 8-bit ports.

The x86 family of processors support the V86 mode of operation by the hardware setup provided in the protected mode of operation. The processors are able to execute a number of 8086 programs as virtual 8086 tasks. A virtual task is set up to provide in software what appears to be an 8086 environment. A virtual 8086 task uses the x86 processor hardware and system software to execute a real mode program. The processor hardware uses the TSS data structure to provide a virtual memory space and executes the instructions for that task using the processor hardware registers and the virtual memory. The system software controls the interface of any virtual task with respect to other tasks being executed. This system software is referred to as the virtual 8086 monitor.

In order to switch to the virtual 8086 mode, the VM bit (17) of the CR0 register must be set. (This is done automatically by a FAR JUMP to a V86 TSS). When operating in the virtual 8086 mode, the processor combines the segment registers (CS or DS or ES or FS or GS) with the standard pointer registers or offsets to form linear addresses in the same manner as an 8086 processor running in real mode. However, these linear addresses go through a paging unit to map to 1 Megabyte of physical memory, which can be anywhere in the system. Thus, when running a virtual 8086 task, the processor forms the V86 mode addresses as in real mode and runs the application program which is the virtual task. The processor returns to protected mode in order to run the system virtual machine monitor software.

Figure 5:
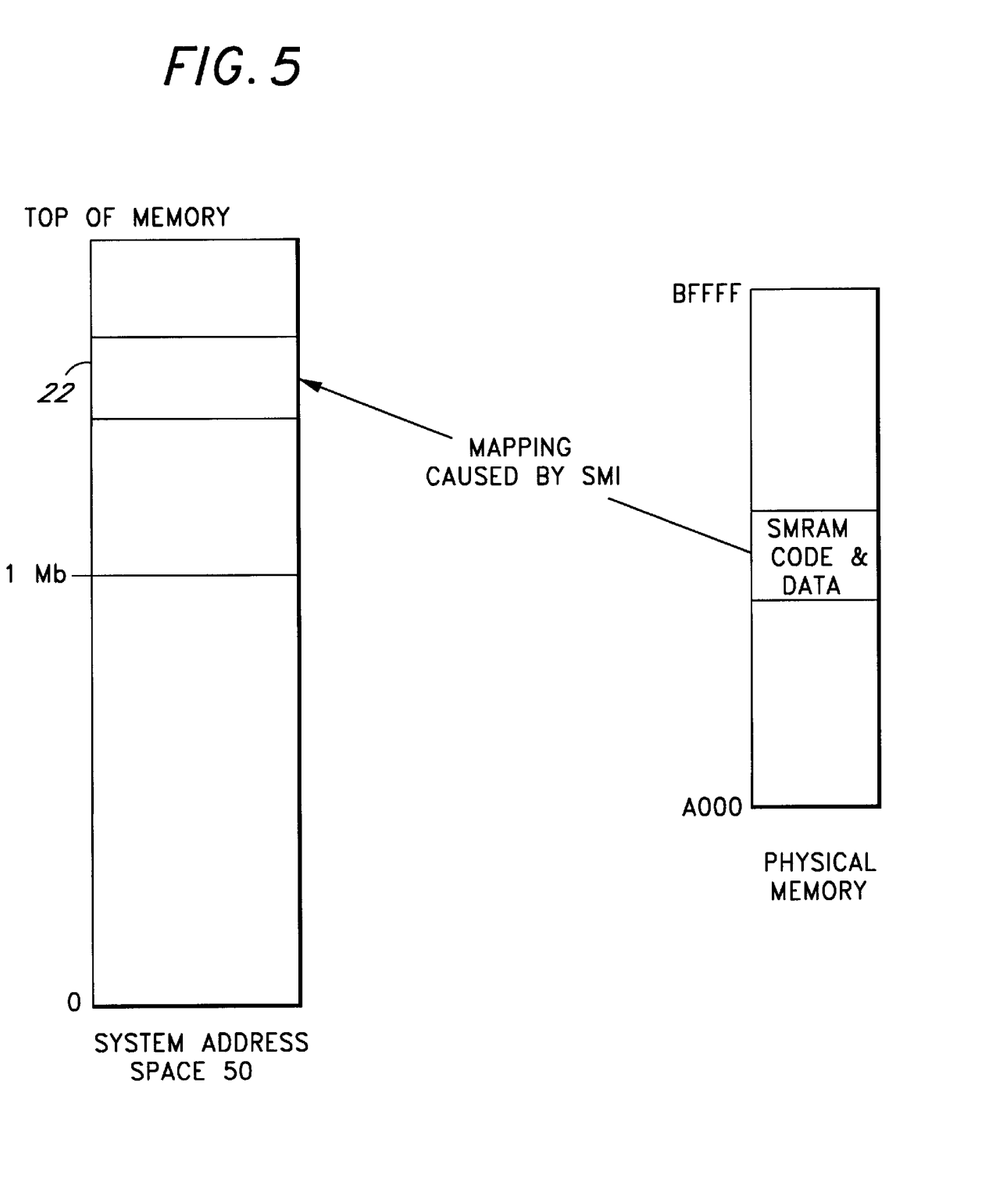
FIG. 5 illustrates the mapping of data and code stored in SMRAM from physical memory to the CPU address space.

As described earlier, SMM is invoked by generating a System Management Interrupt via assertion of the SMI signal to the CPU 14. The CPU 14, in response, asserts the SMIACT control signal provided via line 32 which accesses SMRAM 20. In accordance with the principles of the present invention, the data and code stored in SMRAM 20 located in physical memory is first mapped into a location 22 that is above 1 Megabyte in the system address space 50, as shown in FIG. 5. The current CPU 14 state (context) is stored in SMRAM 20 after assertion of the SMIACT signal. The CPU 14 then jumps to the location in SMRAM 20 that is above 1 Megabyte in the system address space 50 to execute the SMI handler code for performing the system management activities.

Figure 6:
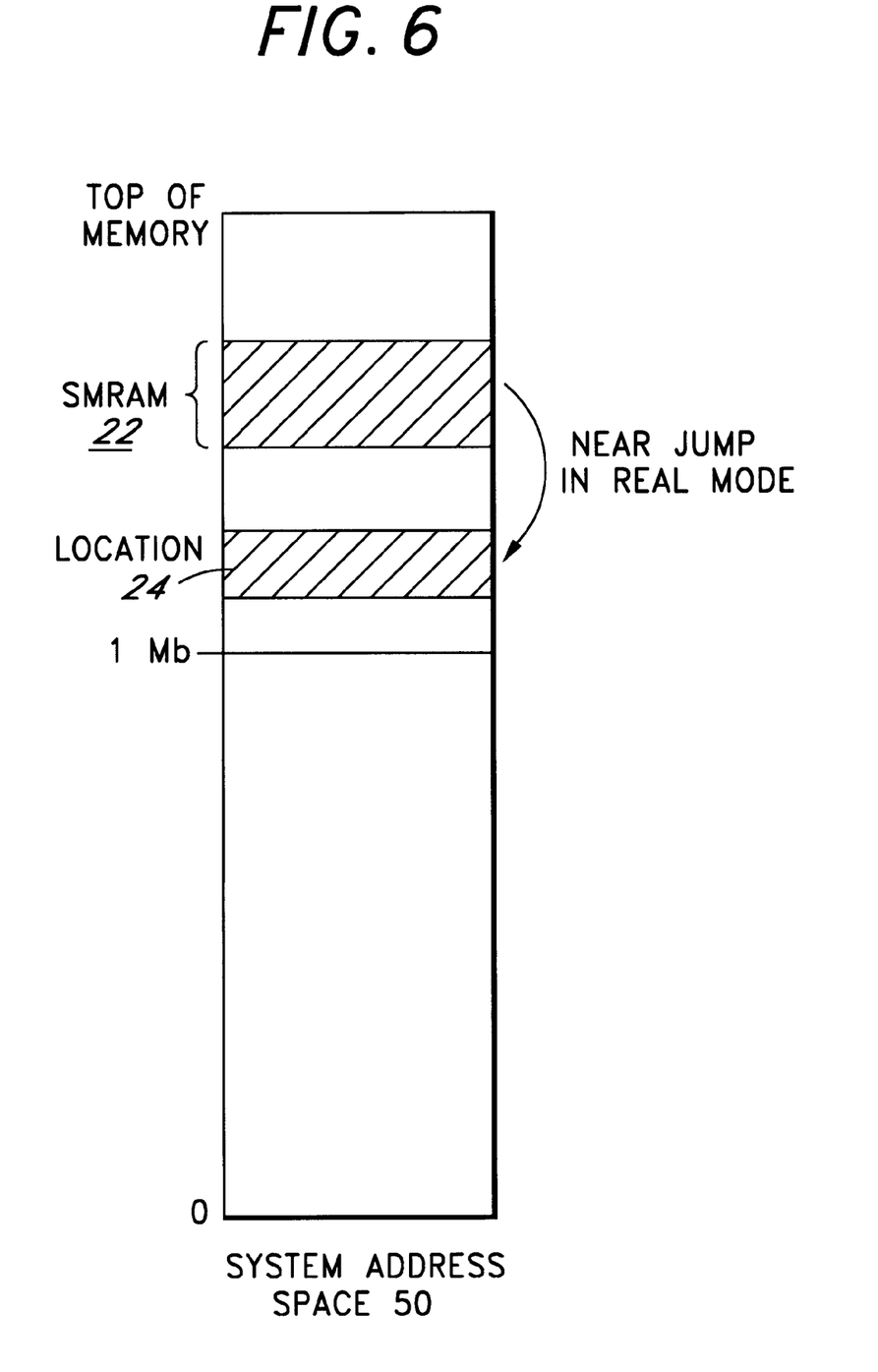
FIG. 6 illustrates the transfer of control to a segment of memory through the execution of a NEAR JMP operation, in accordance with the principles of the present invention.

The SMI handler is then configured to begin execution of SMI code with the CPU 14 in the SMM mode. In particular, the SMI handler performs a NEAR JMP to a location 24 that is still above 1 Megabyte in the system address space 50, as shown in FIG. 6, where a CPU 14 mode change is accomplished. The location 24 must be within 64 Kbytes of the location 22. The SMI handler then issues a control signal to the CPU 14 to configure the CPU 14 to operate in the protected mode. In one embodiment, this is accomplished by setting bit 0 in the CR0 register is to 1.

In one embodiment, the SMI handler is then configured to create page tables that are required when utilizing the paging feature of the CPU 14. The page tables are located in an area of system memory 18 (FIG. 1). Each page table contains 1024 entries that point to the starting address of 1024 individual pages.

The SMI handler is also configured to create a TSS and an I/O bit map that is required when utilizing the task state segment (TSS) feature of the CPU 14. The use of the I/O bit map provides a protection mechanism for access to the I/O address space. As described earlier, the I/O bit map is stored in the TSS of the task invoked.

In an alternate embodiment, the page tables and the I/O bit map may be created during the power-on self test (POST), prior to invocation of SMM. In this alternate embodiment, the page tables and the TSS and I/O bit map only have to be created once, and they are not deleted upon completion of the SMM activities. In addition, in either embodiment, the page tables may be created without creating the TSS and I/O bit map at the same time. Conversely, the TSS and I/O bit map may be created without creating the page tables at the same time.

Once the page tables and the TSS and I/O bit map have been created, then the SMI handler invokes the paging feature of the CPU 14. In one embodiment, this is performed by setting bit 31 in the CR0 register of the x86 processor as marketed by Intel Corp. The SMI handler then switches the CPU 14 to the virtual mode. In one embodiment, this may be performed by executing a FAR JMP to the TSS for switching to the virtual mode. In addition, the physical memory area above 1 Megabyte is mapped virtually to the first Megabyte of the task's linear address space. As a result, a task switch is invoked to change the operational mode of the processor 14 to the virtual mode, above the 1 Megabyte boundary.

Once in virtual mode, the CPU 14 determines the logical address of the application the same way as in real mode. The physical address is determined by using the page tables. The SMI handler then begins to perform the task required to process the system management activities. During execution of the system management activities, the software occasionally configures the processor to operate in the protected mode so as to facilitate the execution of certain special tasks. These special tasks include cache flushes and the accessing of the floating point unit in the arithmetic logic unit, as is known by one of skill in the art. If so, the SMI handler configures the CPU 14 to operate in protected mode. Once thus configured, the CPU 14 may process the special task(s). Upon completion of the special task(s), the SMI handler configures the CPU 14 to operate in virtual mode so that system management activities may resume.

Figure 3G:
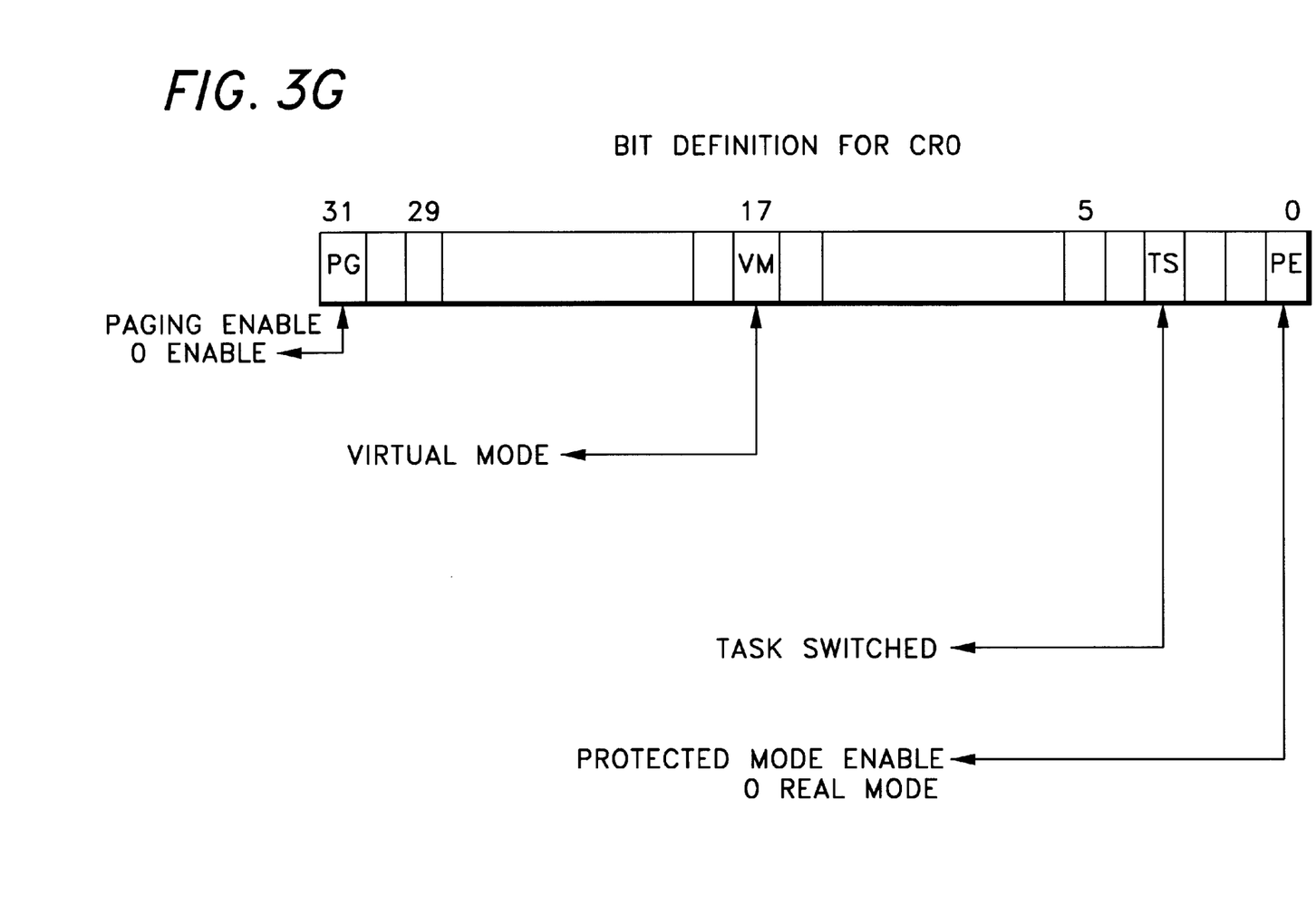

Upon completion of the system management activities, the SMI handler configures the CPU 14 to exit the virtual mode, which also configures the CPU 14 to operate in the protected mode again. Paging is then disabled by clearing the PG bit, bit 31 (see FIG. 3G). The SMI handler then executes a resume (RSM) instruction which restores the CPU 14's context in SMRAM 20, de-asserts the SMIACT signal, and then returns control to the previously interrupted operating system or application program execution.

Figure 7A:
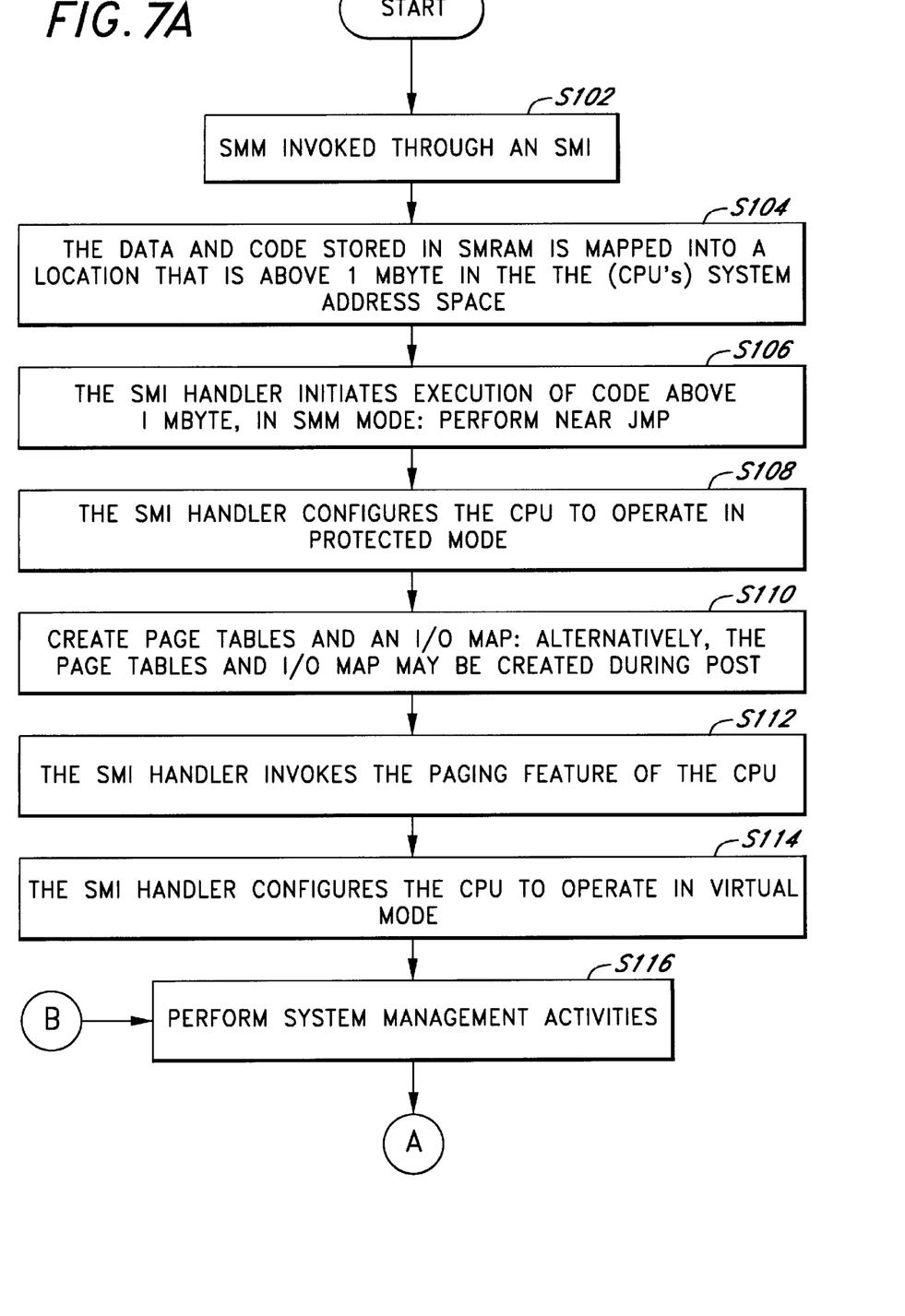
FIGS. 7A and 7B are flowcharts illustrating one embodiment of the process of the present invention.
Figure 7B:
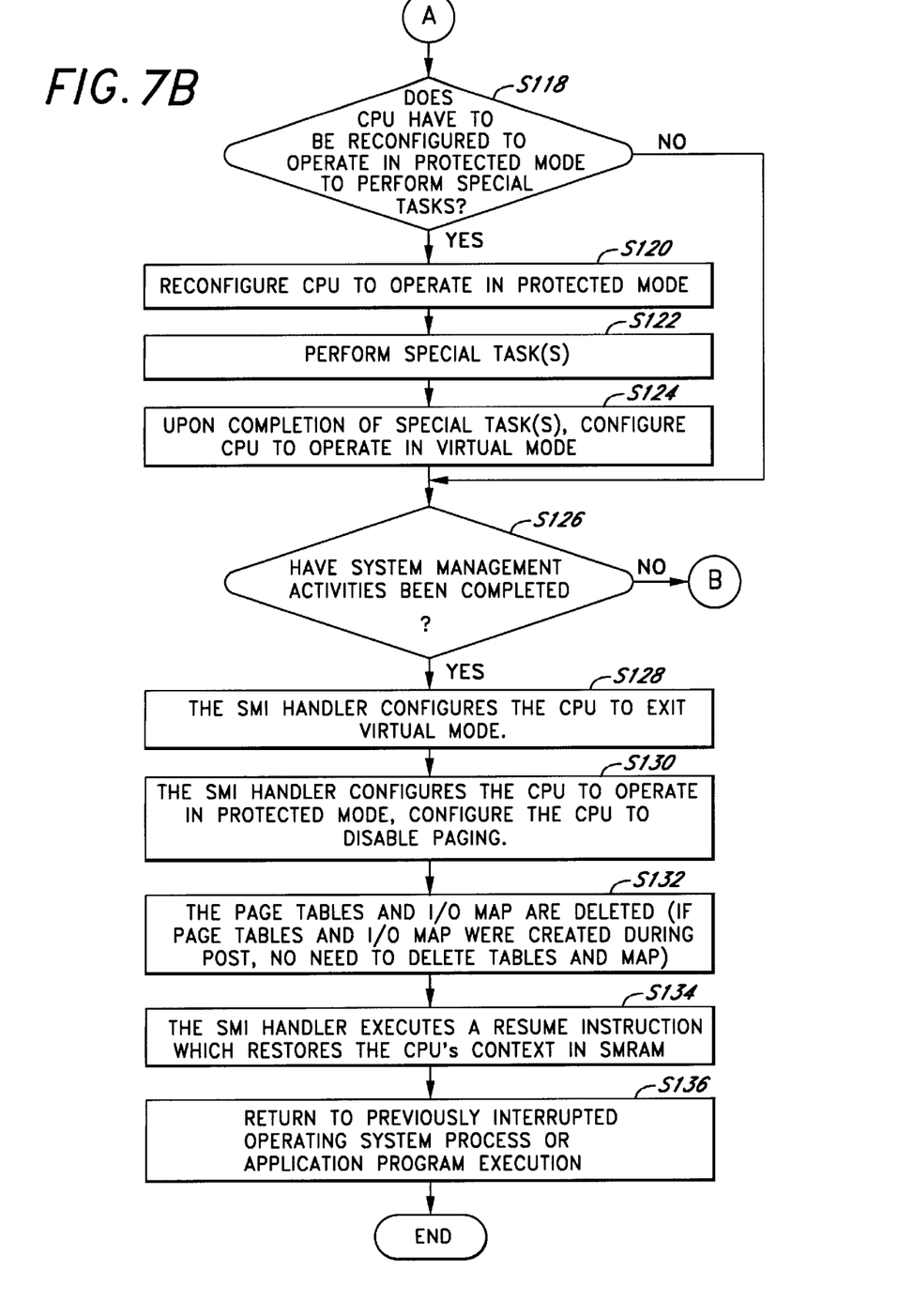

FIGS. 7A and 7B are flowcharts illustrating one embodiment of the process of the present invention. Beginning from a start state, the process S100 proceeds to process step S102, where SMM is invoked through the issuance of an SMI. The process S100 then proceeds to process step S104, where in particular, the data and code stored in SMRAM 20 located in physical memory is first mapped into a location 22 that is above 1 Megabyte in the system address space 50. The current CPU 14 state (context) is stored in SMPAM 20. The SMI handler then initiates execution of the SMI code above 1 Megabyte while the CPU 14 is still operating in SMM mode, as shown in process step S106. In particular, the SMI handler performs a NEAR JMP to a location that is still above 1 Megabyte in the system address space 50. The process S100 then proceeds to process step S108, where the SMI handler then issues a control signal to the CPU 14 to configure the CPU 14 to operate in the protected mode. The SMI handler then creates page tables and an I/O table (process step S110). Alternatively, the page tables an the I/O table may be created during POST. Next, the SMI handler invokes the paging feature of the CPU 14 (process step S112). The process S100 then advances to process step S114, where the SMI handler configures the CPU to operate in virtual mode. The SMI handler then proceeds to process the SMI and to perform system management activities, as shown in process step S116.

During execution of the system management activities, the software occasionally reconfigures the processor to operate in the protected mode so as to facilitate the execution of certain special tasks (decision step S118). These special tasks include cache flushes and the accessing of the floating point unit in the arithmetic logic unit, as is known by one of skill in the art. If so, the process S100 proceeds to process step S120, where the SMI handler configures the CPU 14 to operate in protected mode. Once thus configured, the CPU 14 may process the special task(s) (process step S122). Upon completion of the special task(s), the SMI handler configures the CPU 14 to operate in virtual mode. The SMI handler then proceeds to decision step S126. If, as decision step S118, the process S100 determines that there are no special tasks that have to be performed, the process S100 proceeds directly to decision step S126.

At decision step S126, the process S100 queries if all system management activities have been completed. If not, the process S100 proceeds to process step S116, where it continues processing system management activities. If all system management activities have been completed, the SMI handler configures the CPU 14 to exit virtual mode (process step S128) and then configures the CPU 14 to operate in the protected mode again. Paging is then disabled (process step S130). If the page tables and the I/O table were created after invocation of the SMI and not during post, the process S100 proceeds to process step S132 to delete the page tables and the I/O table. Next, the SMI handler executes a resume (RSM) instruction which restores the CPU 14's context to SMRAM 20 (process step S134). The process S100 then returns control to the previously interrupted operating system process or application program execution, as shown in process step S136. The process S100 then terminates.

Through the use of the present invention, an apparatus and method for efficiently executing code within a system management mode is provided. In particular, the present invention facilitates the execution of code within a system management mode without duplication of programming code, increase use of memory or increased maintenance. The use of the present invention facilitates the implementation of code that is simple, compact and is easy to debug.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus for executing instructions in a system management mode in a processor-based system, comprising:
   a memory for storing instruction sequences by which the processor-based system is processed;
   a processor having a system address space, the processor for executing the stored instruction sequences; and
   wherein the stored instruction sequences cause the processor to: (a) configure the processor to operate in a protected mode while in system management mode, the processor operating at an address greater than one megabyte; (b) invoke a paging feature of the processor; (c) configure the processor to operate in a virtual mode; and (d) process the instruction sequences stored, wherein the process steps occur upon the receipt of an instruction to process a system management request.

2. The apparatus of claim 1, wherein (b) comprises:
   (b.1) creating at least one page table; and
   (b.2) invoking a paging feature of the processor.

3. The apparatus of claim 1, wherein the instruction sequences further cause the processor to create at least one page table prior to (a).

4. The apparatus of claim 1, wherein (a) comprises:
   (a.1) performing a near jump to a second location; and
   (a.2) configuring the processor to operate in a protected mode.

5. The apparatus of claim 1, wherein the instruction sequences further cause the processor to:
   (e) determine if control should be transferred to instruction sequences for executing a task that requires the processor to be configured to operate in protected mode;
   (f) if so, configuring the processor to operate in the protected mode, and executing the instruction sequences for executing the task; and (g) otherwise to continue to process the instruction sequences stored.

6. The apparatus of claim 5, wherein the instruction sequences further cause the processor to:

(h) determine if execution of instruction sequences pertaining to system management activities have been completed; and (i) if so, configuring the processor to disable operation in the virtual mode, configuring the processor to operate in the protected mode, and configuring the processor to disable paging; otherwise continuing to execute instruction sequences pertaining to system management activities.

7. The apparatus of claim 5, wherein the instruction sequences further cause the processor to:

(h) restore the processor's context in memory; and (i) return to a calling function.

8. The apparatus of claim 7, wherein the instruction sequences further cause the processor to:

(j) delete at least one page table;

(k) restore the processor's context in memory; and (l) return to a calling function.

9. The apparatus of claim 1, wherein the instruction sequences further cause the processor to:

(e) determine if execution of instruction sequences pertaining to system management activities have been completed; and (f) if so, configuring the processor to disable operation in the virtual mode, configuring the processor to operate in the protected mode, and configuring the processor to disable paging; otherwise continuing to execute instruction sequences pertaining to system management activities.

10. The apparatus of claim 9, wherein the instruction sequences further cause the processor to:

(g) restore the processor's context in memory; and (h) return to a calling function.

11. A method for executing instructions in a system management mode in a processor-based system, comprising the acts of:

(a) configuring a processor to operate in a protected mode, while in system management mode, the processor operating at an address greater than one megabyte;

(b) invoking a paging feature of the processor;

(c) configuring the processor to operate in a virtual mode;

(d) processing instruction sequences stored in a first location; and wherein the acts occur upon the receipt of an instruction to process a system management request.

12. The method of claim 11, wherein (b) comprises:

(b.1) creating at least one page table; and (b.2) invoking a paging feature of the processor.

13. The method of claim 11, further comprising creating at least one page table prior to (a).

14. The method of claim 11, wherein (a) comprises:

(a.1) performing a near jump to a second location; and (a.2) configuring the processor to operate in a protected mode.

15. The method of claim 11, further comprising:

(e) determining if control should be transferred to instruction sequences for executing a task that requires the processor to be configured to operate in protected mode;

(f) if so, configuring the processor to operate in the protected mode, and executing the instruction sequences for executing the task; and (g) otherwise to continue to process the instruction sequences stored.

16. The method of claim 15, further comprising:

(h) determining if execution of instruction sequences pertaining to system management activities have been completed; and (i) if so, configuring the processor to disable operation in the virtual mode, configuring the processor to operate in the protected mode, and configuring the processor to disable paging; otherwise continuing to execute instruction sequences pertaining to system management activities.

17. The method of claim 15, further comprising:

(h) restoring the processor's context in memory; and (i) returning to a calling function.

18. The method of claim 17, further comprising:

(j) deleting at least one page table;

(k) restoring the processor's context in memory; and (l) returning to a calling function.

19. The method of claim 11, further comprising:

(e) determining if execution of instruction sequences pertaining to system management activities have been completed; and (f) if so, configuring the processor to disable operation in the virtual mode, configuring the processor to operate in the protected mode, and configuring the processor to disable paging; otherwise continuing to execute instruction sequences pertaining to system management activities.

20. The method of claim 19, further comprising:

(g) restoring the processor's context in memory; and (h) returning to a calling function.

21. Computer-executable process for executing instructions in a system management mode in a processor-based system, comprising:

(a) configuring the processor to operate in a protected mode while in system management mode, the processor operating at an address greater than one megabyte;

(b) invoking a paging feature of the processor;

(c) configuring the processor to operate in a virtual mode;

(d) processing instruction sequences stored in a first location; and wherein the process occurs upon the receipt of an instruction to process a system management request.

22. Computer-executable process of claim 21, wherein (b) comprises:

(b.1) creating at least one page table; and (b.2) invoking a paging feature of the processor.

23. Computer-executable process of claim 21, further comprising creating at least one page table prior to step (a).

24. Computer-executable process of claim 21, wherein (a) comprises:

(a.1) performing a near jump to a second location; and (a.2) configuring the processor to operate in a protected mode.

25. Computer-executable process of claim 21, further comprising:

(e) determining if control should be transferred to instruction sequences for executing a task that requires the processor to be configured to operate in protected mode;

(f) if so, configuring the processor to operate in the protected mode, and executing the instruction sequences for executing the task; and (g) otherwise to continue to process the instruction sequences stored.

26. Computer-executable process of claim 25, further comprising:

(h) determining if execution of instruction sequences pertaining to system management activities have been completed; and (i) if so, configuring the processor to disable operation in the virtual mode, configuring the processor to operate in the protected mode, and configuring the processor to disable paging; otherwise continuing to execute instruction sequences pertaining to system management activities.

27. Computer-executable process of claim 25, further comprising:

(h) restoring the processor's context in memory; and (i) returning to a calling function.

28. Computer-executable process of claim 27, further comprising:

(j) deleting at least one page table;

(k) restoring the processor's context in memory; and (l) returning to a calling function.

29. Computer-executable process of claim 21, further comprising:

(e) determining if execution of instruction sequences pertaining to system management activities have been completed; and (f) if so, configuring the processor to disable operation in the virtual mode, configuring the processor to operate in the protected mode, and configuring the processor to disable paging; otherwise continuing to execute instruction sequences pertaining to system management activities.

30. Computer-executable process of claim 29, further comprising:

(g) restoring the processor's context in memory; and (h) returning to a calling function.

* * * * *